United States Patent [19]
Oi et al.

[11] Patent Number: 5,613,476
[45] Date of Patent: Mar. 25, 1997

[54] FUEL SUPPLY DEVICE

[75] Inventors: Kiyotoshi Oi, Kariya; Atsushige Kobayashi, Nagoya; Kazushi Nakashima, Obu; Yasushi Kawano, Anjo; Hideki Kaga, Kariya, all of Japan

[73] Assignee: Nippondenso Co., Ltd., Kariya, Japan

[21] Appl. No.: 301,429

[22] Filed: Sep. 9, 1994

[30] Foreign Application Priority Data

Sep. 10, 1993 [JP] Japan ..................... 5-225848

[51] Int. Cl.⁶ ................................. F02M 37/04
[52] U.S. Cl. .................... 123/509; 123/514; 137/115.01; 137/576
[58] Field of Search ..................... 123/509, 514, 123/506; 137/569, 572, 576, 568, 570, 571, 115; 417/309

[56] References Cited

U.S. PATENT DOCUMENTS

| | | | |
|---|---|---|---|
| 4,694,857 | 9/1987 | Harris | 137/574 |
| 4,953,582 | 9/1990 | Kennedy | 137/569 |
| 5,024,188 | 6/1991 | Hartke | 123/509 |
| 5,044,344 | 9/1991 | Tuckey et al. | |
| 5,056,492 | 10/1991 | Banse | 123/509 |
| 5,078,167 | 1/1992 | Brandt | 137/115 |
| 5,148,792 | 9/1992 | Tuckey | 137/569 |
| 5,231,967 | 8/1993 | Baltz | 123/509 |
| 5,289,810 | 3/1994 | Bauer | 123/576 |
| 5,361,742 | 11/1994 | Briggs | 123/514 |

FOREIGN PATENT DOCUMENTS 3164561 7/1991 Japan.

*Primary Examiner*—Carl S. Miller
*Attorney, Agent, or Firm*—Cushman, Darby & Cushman IP Group of Pillsbury Madison & Sutro LLP

[57] ABSTRACT

An in-tank type fuel pump which can easily be installed and reduces the vibration caused by the fuel pump. The fuel pumped up by a pump part passes through a filter to have foreign matter contained therein removed. Then, the fuel flows from a fuel passage, through an opening part in a cap, into a recessed part and a second fuel passage. The fuel that has flowed into the second fuel passage lifts a check valve and flows into the recessed part. Then, the fuel flows through a third fuel passage to a discharge pipe, and then is guided to the outside of the fuel tank. A ball moves within a large-diameter passage according to the fuel pressure to regulate the fuel pressure required for fuel injection. When the fuel pumping is ceased, the fuel pressure falls to 0, and therefore the ball is forced to contact a valve seat by the spring force of a compression coil spring. Then, the head part of the check valve is forced to contact a valve seat to block the fuel passage. As a result, the residual fuel pressure can be maintained downstream from the recessed part.

11 Claims, 14 Drawing Sheets

FUEL SUPPLY DEVICE

BACKGROUND OF THE INVENTION

1. Field of the Invention:

The present invention generally relates to a fuel supply device. More particularly, the present invention relates to a fuel supply device that supplies fuel from a fuel tank to a fuel consumption device, such as an internal combustion engine.

2. Related Art:

A system is known in which fuel pressure is maintained at a constant level by a pressure regulator. The fuel is atomized and supplied to an internal combustion engine under the controlled pressure. In this system, excess fuel resulting from fuel pressure control is returned to the fuel tank.

U.S. Pat. Nos. 5,044,344, 5,148,792, and 5,078,167 disclose a system that supplies all the fuel from a fuel tank to an internal combustion engine by means of pressure feeding. Such a system has no return route. In the system disclosed in the U.S. Pat. Nos. 5,044,344 and 5,148,792, the ability of a fuel pump is fed back and controlled according to the pressure detected by a pressure sensor. Further, a relief valve is provided in a fuel supply route to protect the fuel from excessive pressurization. However, such a fully and electronically controlled system as the above is expensive.

In contrast with such a fully and electronically controlled system, a less expensive system can be achieved by providing a pressure regulator within the fuel tank, as is disclosed in U.S. Pat. No. 5,078,167. Furthermore, even with the pressure regulator provided in the fuel tank, electronic control can also be used to reduce surplus fuel quantity discharged by the pressure regulator and save wasteful power consumption.

In such a conventional fuel supply device, however, a terminal disposed on the wall of the fuel tank is connected to the fuel pump disposed within the fuel tank via rubber piping. This type of fuel pump requires a considerable number of man-hours to install, which increases manufacturing cost.

Also, in the systems discussed above, as a check valve, a relief valve and/or a pressure regulator for preventing excessive high pressure, a projected part of the terminal is disposed on the wall of the fuel tank. Such a structure includes the problem where the shape around the discharge part of the main body of the fuel pump has to be modified. Further, due to the uniqueness of the systems, it is difficult to share many parts and components with many other fuel supply systems.

Furthermore, in the system disclosed in U.S. Pat. No. 5,078,167, the temperature of the fuel in the fuel supply route rises while the fuel pump is at a stoppage, and when the fuel pressure rises, the pressure regulator opens to lower the fuel pressure. This causes the problems of a decreasing quantity of fuel in the fuel supply route as time passes, air bubbles become mixed in the fuel or fuel vapor is generated, and as a result, when the fuel pump is restarted, fuel containing air bubbles or fuel vapor is supplied to the internal combustion engine. Such is not conducive to efficient operation of the internal combustion engine.

SUMMARY OF THE INVENTION

Accordingly, it is the primary object of the present invention to provide a fuel supply device having a connecting member that can accurately connect a fuel discharge pipe disposed on the wall of a fuel tank to a fuel pump requiring only simple assembly.

In addition to the above primary object, it is an object of the present invention to provide a fuel supply device that can accurately fix the above connecting member to the fuel pump.

In addition to the above primary object, it is a further object of the present invention to simplify the composition of the entirety of the fuel supply device by providing the above connecting member with functions other than simply the connection between the fuel discharge pipe and the fuel pump.

It is a still further object of the present invention to provide a fuel supply device by providing the above connecting member, particularly for use in a system having no fuel return route, with a pressure control valve for regulating the fuel pressure and/or a check valve for maintaining the pressure in the fuel supply route at a constant level.

It is a still further object of the present invention to reduce the number of parts and components disposed within the fuel tank and the man-hours required for assembly by providing the above connecting member with a connector for supplying electric power to the fuel pump.

It is a still further object of the present invention to provide a fuel supply device that is suitable particularly for use in a system having no fuel return route and can accurately maintain the pressure of the fuel in the fuel supply route extending outwards from the fuel tank even when the fuel pump is stopped.

According to the present invention, the fuel discharge pipe disposed on the wall of the fuel tank and the fuel pump are connected to each other by a block-type connecting member. Moreover, each of the connection parts of the block-type connecting member disposed at both sides of the fuel discharge pipe and the fuel pump is constructed by a tubular member, a tubular space part accommodating the tubular member and a sealing member intervening between the tubular member and the tubular space part. In such a construction, because both connecting parts can achieve connection only by inserting the tubular member into the tubular space part, the fuel discharge pipe and the fuel pump can be connected to each other in simple connecting processes.

Here, by modifying the connecting member according to the tank shape, etc., the connection can be achieved between the fuel discharge pipe and the fuel pump using a fuel tank of a common shape.

In addition, it is preferable that the connecting member should be equipped with a pressure control valve for controlling the fuel pressure and/or a check valve for maintaining the pressure in the fuel supply route in order to simplify the composition of the system having no return route.

Also, it is preferable that the connecting member should be formed into a shape which fits an electric power receiving connector provided on the fuel tank in order to accurately fix the connecting member.

Furthermore, it is preferable that the connecting member should be integrally formed with an electric power supplying connector connected to the power receiving connector provided on the fuel tank in order to achieve electrical connection to the fuel pump as well as the connection between the connecting member and the fuel pump.

In addition, when the discharge pipe of the fuel pump is disposed in a decentered position off the fuel pump axis, it is preferable that the connecting member of the fuel discharge pipe disposed on the wall of the fuel tank should be positioned on the extended line of the fuel pump axis in order to support both ends of the fuel pump on the above axis and reduce the vibration.

It should be noted that when the pressure control valve is provided within the fuel tank and the fuel route extending from the fuel tank is blocked, it is preferable that the check valve should be disposed in the downstream side from the pressure control valve in order to accurately maintain the pressure in the fuel route extending from the fuel tank even while the fuel pump is stopped.

BRIEF DESCRIPTION OF THE DRAWINGS

These and other objects, features, and characteristics of the present invention, as well as the functions of the related parts and the economies of manufacture will become apparent from the following detailed description, the drawings, and the appended claims, all of which form a part of this specification.

DETAILED DESCRIPTION OF THE PRESENTLY PREFERRED EXEMPLARY EMBODIMENTS

Embodiments of the present invention will now be described with reference to the attached drawings.

Figure 3:
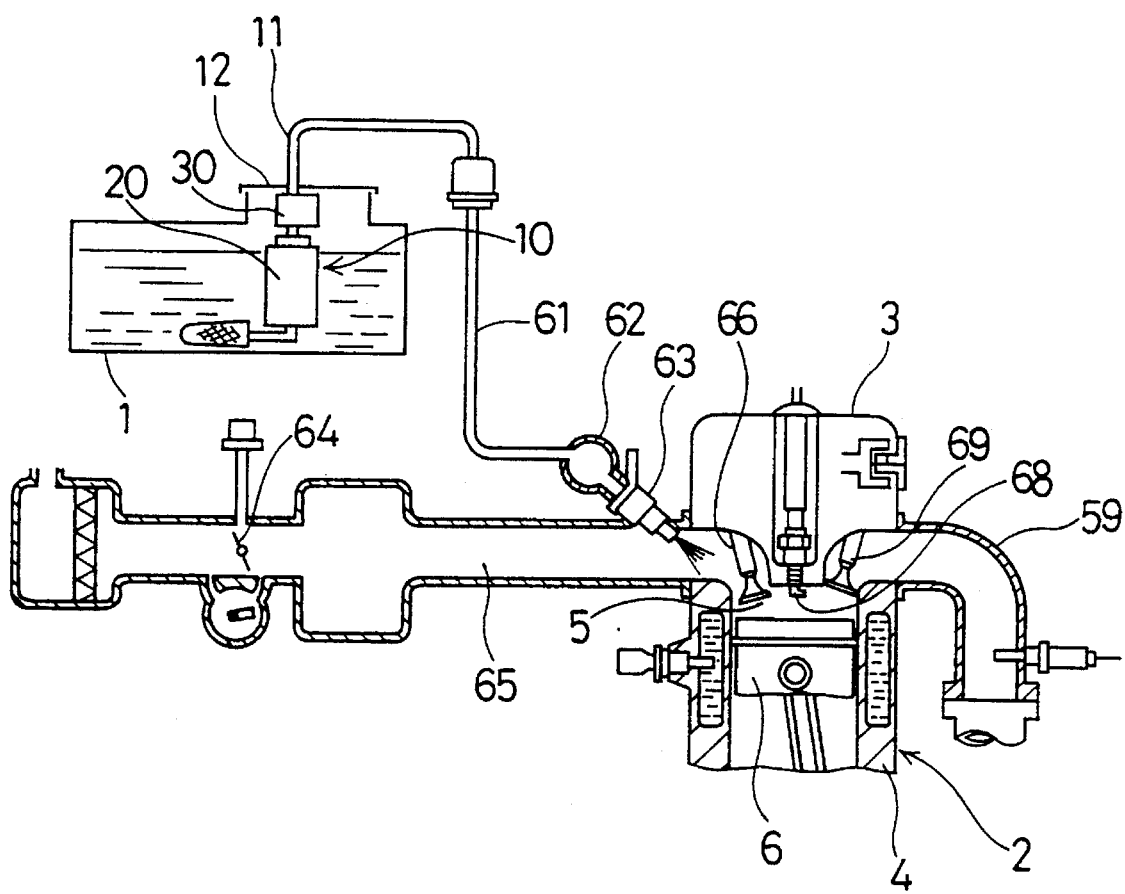
FIG. 3 is a schematic cross-sectional view illustrating an application of the in-tank type pump of the first embodiment to a fuel injection device.

FIG. 3 illustrates an application of the present invention, wherein an in-tank type fuel pump as a fuel supply device of the first embodiment according to the present invention is applied to a fuel injection system in an internal combustion engine.

In internal combustion engine 2, combustion chamber 5 is partitioned by cylinder head 3, cylinder block 4 and piston 6. On the lower face of cylinder head 3 facing combustion chamber 5, ignition plug 68 is fixed.

In-tank type fuel pump 10 is disposed in fuel tank 1, and discharge pipe 11 and pump part 20 are connected to each other by connecting member 30. Discharge pipe 11 passes through flange 12 of fuel tank 1 to the exterior of fuel tank 1. The fuel pumped up by pump part 20 is fed from discharge pipe 11, through supply pipe 61, into delivery pipe 62, and then injected by injector 63 from delivery pipe 62 into suction pipe 65. The injected fuel is mixed with air whose flow rate is regulated by throttle valve 64. The air-fuel mixture is drawn into combustion chamber 5 while suction valve 66 is open, and then the mixture is ignited by sparks from ignition plug 68 and burns. The exhaust gas generated by the combustion is exhausted into exhaust pipe 59 while exhaust valve 69 is open.

Figure 1:
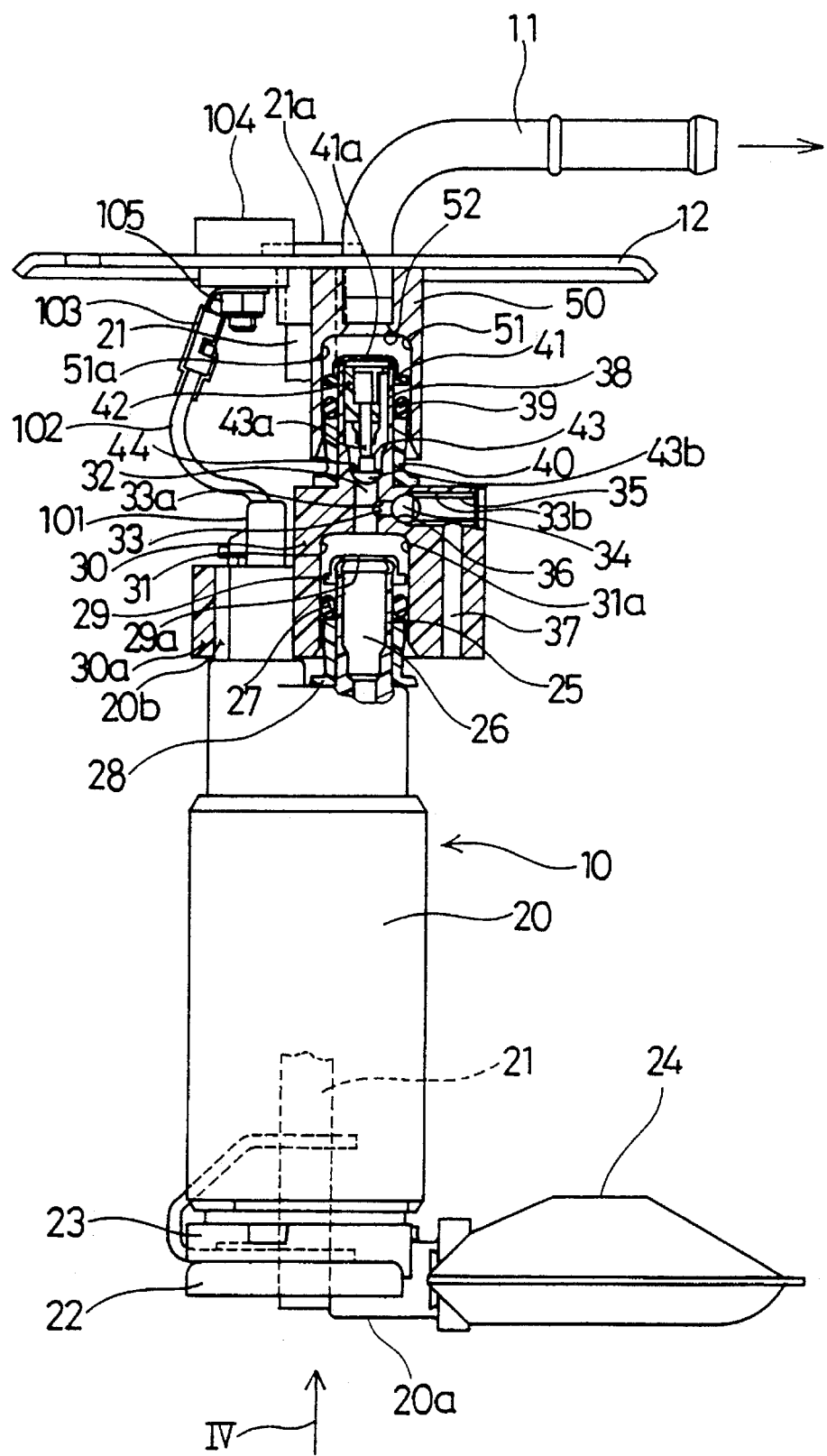
FIG. 1 is a partial cross-sectional view illustrating a fuel supply device which is an in-tank type fuel pump of the first embodiment.
Figure 2:
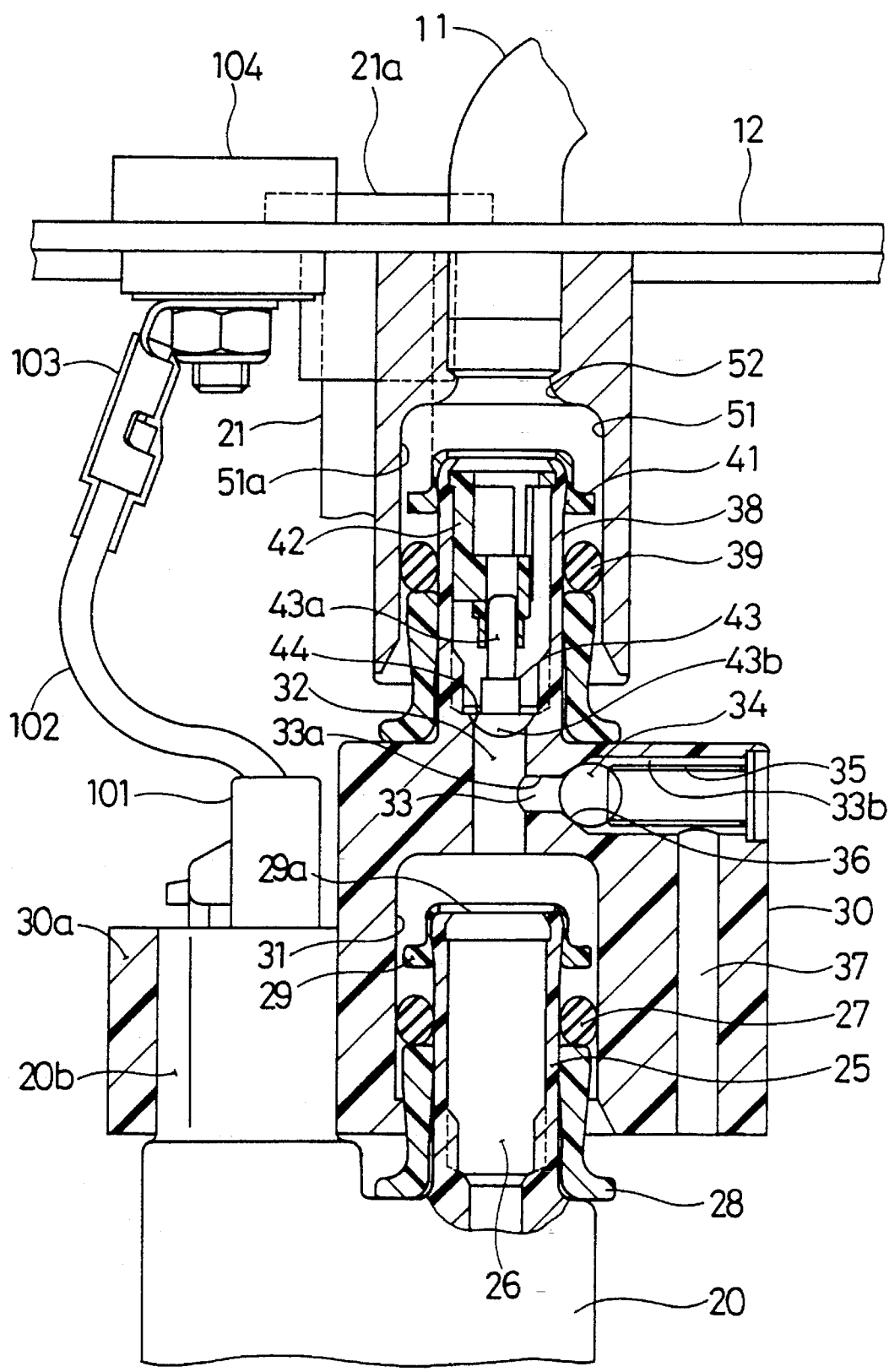
FIG. 2 is an enlarged cross-sectional view illustrating the main part of the in-tank type fuel pump of the first embodiment.
Figure 4:
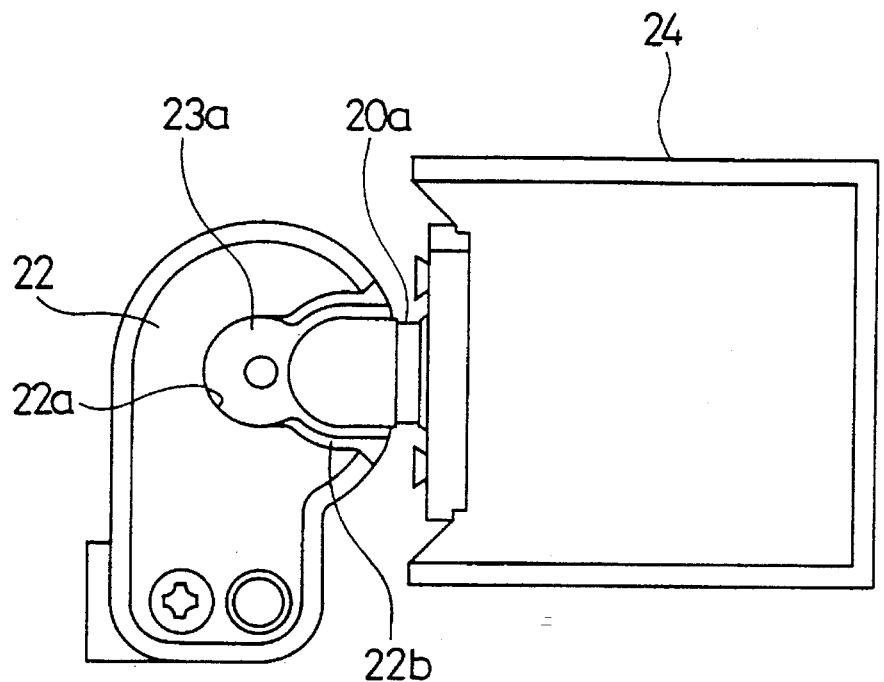
FIG. 4 is a view in the direction of IV in FIG. 1.

As illustrated in FIGS. 1, 2 and 4, fuel pump 10 comprises pump part 20 for pumping fuel from fuel tank 1, connecting member 30 for connecting pump part 20 to supporting member 50, which couples connecting member 30 to discharge pipe 11, which guides the pumped fuel to the exterior of fuel tank 1.

Pump part 20 is fixed to support base 22 of support pipe 21 through rubber plate 23. Support pipe 21 is fixed to flange 12 by fitting 21a. Recessed part 22a is formed in the central part of support base 22 to which pump part 21 is fixed, and projected part 23a of rubber plate 23 fits in recessed part 22a (FIG. 4). Recessed part 22a widens towards filter 24 (described later), forming a wide opening part 22b. A clearance is formed between the wide opening part 22b and the projected part 23a.

A motor (not illustrated) housed in pump part 20 is fed with a driving current from terminal 101. Terminal 101 is connected to connector 103 via cable 102. Connector 103 is fixed by bolt 105 to terminal 104, which is fixed to flange 12. Terminal 104 is fed with the driving current for the motor housed in pump part 20 by an electric power supply part (not illustrated).

Filter 24 is attached to fuel suction pipe 20a of pump part 20 to remove foreign matter from the fuel pumped from fuel tank 1.

The outer wall of discharge port 25 is sealed by O-ring 27, and resin cap 29 is press fitted over the top of discharge port 25 to prevent O-ring 27 from detaching. In the center of cap 29, opening part 29a is formed. Round tubular spacer 28 is fixed on the outer wall of discharge port 25 to hold O-ring 27 in place.

In connecting member 30, frame member 30a is fixed to pump part 20 encompassing connector housing 20b. Connecting member 30 includes recessed part 31 formed at the side of pump part 20 at the upstream end thereof and discharge port 38 in the downstream end thereof. Fuel passage 32 is formed following recessed part 31 to allow communication between recessed part 31 and discharge port 38. Recessed part 31 houses discharge port 25, and inner wall 31a of recessed part 31 is in a close contact with O-ring 27.

Over the top of discharge port 38 is press fitted resin cap 41, and in the center of cap 41 opening part 41a is formed. The outer wall of discharge port 38 is sealed by O-ring 39, and round tubular spacer 40 holds O-ring 39 in place. Stopper 42 is fixed to the inner wall of the discharge port 38. Check valve 43 is made of resin such as polyacetal, and shaft 43a of check valve 43 is slidably supported by stopper 42. Stopper 42 is only designed to hold check valve 42 and does not prevent the fuel from flowing from fuel passage 32, through opening part 41a of resin cap 41, into discharge pipe 11. Head part 43b of check valve 43 can contact the valve seat formed within fuel passage 32.

Relief passage 33 is formed within fuel passage 32. Relief passage 33 includes small-diameter passage 33a and large-diameter passage 33b, with valve seat 36 being formed in the boundary part between small-diameter passage 33a and large-diameter passage 33b. Steel ball 34 is slidably housed within the large-diameter passage 33b and pressed against valve seat 36 by the spring force of compression coil spring 35. Relief passage 37 is formed to allow communication from relief passage 33 to the outer part of fuel pump 10.

Supporting member 50 is fixed to flange 12 by means of brazing or the like. In the fuel upstream direction from supporting member 50, recessed part 51 is formed, and within recessed part 51 is housed discharge port 38. The inner wall of recessed part 51 closely contacts O-ring 39, and fuel passage 52 is formed following recessed part 51. Discharge pipe 11 is inserted in fuel passage 52 to communicate with fuel passage 52 and is fixed to flange 12 by means of brazing or the like.

Next, the operational principle of fuel pump 10 will be described.

The motor of pump part 20 is driven by the driving current supplied through terminal 101, whereby the fuel in fuel tank 1 is pumped up. Foreign matter in the fuel is removed therefrom by filter 24. The fuel flows from fuel passage 26, through opening part 29a of cap 29, to recessed part 31 and fuel passage 32. The fuel flowing into fuel passage 32 lifts check valve 43 and flows into recessed part 51. The fuel flowing into recessed part 51 flows from fuel passage 52 through discharge pipe 11 and is guided to the outside of fuel tank 1.

Ball 34 moves within large-diameter passage 33b according to the pressure of the fuel fed from pump part 20 so that the balance is maintained between the fuel pressure and the spring force of compression coil spring 35, whereby ball 34 regulates the fuel pressure required for fuel injection from injector 63. When the fuel pressure exceeds the preset pressure (approx. 250 to 300 kPa), ball 34 reaches relief passage 37 to allow the fuel to flow thereinto from small-diameter passage 33a. In this arrangement, any excess fuel supplied from fuel pump 10 due to the fuel pressure exceeding the above preset pressure is returned through return passage 37 into fuel tank 1.

When the driving current fed to the motor of pump part 20 is shut off and pump part 20 stops pumping up fuel, the pressure of the fuel supplied from pump part 20 lowers. As a result, ball 34 comes to contact valve seat 36 by the spring force of compression coil spring 35. Then, in check valve 43, head part 43a contacts valve seat 44 due to the self-weight thereof, whereby the fuel passage 32 is blocked. Accordingly, in the fuel downstream direction from recessed part 51, the fuel pressure before the motor of pump part 20 stops is maintained as residual fuel pressure.

In the first embodiment, as the coupling part between pump part 20 and connecting member 30 is sealed with O-ring 27 and the coupling part between connecting member 30 and supporting member 50 is sealed with O-ring 39, the installation of each member can be easily performed. In addition, as the vibration caused by the driving of the motor of pump part 20 is absorbed and reduced by O-rings 27 and 39, the vibration can be prevented from resonating with the eigenfrequency of the fuel tank and becoming loud enough to be heard in the vehicle compartment.

Moreover, in the first embodiment, ball 34 and compression coil spring 35, both disposed within connecting member 30, function as a relief valve for regulating the fuel pressure, and check valve 43 disposed within discharge port 38 of connecting member 30 functions to maintain the residual fuel pressure. Therefore, there is no need to provide a relief valve or a check valve within pump part 20, whereby the number of parts and components used for pump part 20 can be reduced. In addition, as check valve 43 is provided downstream from ball 34 to hold the residual fuel pressure, there is no need to provide ball 34 for obtaining a high sealing ability, whereby ball 34 and fuel passage 33 can be easily produced.

Figure 15:
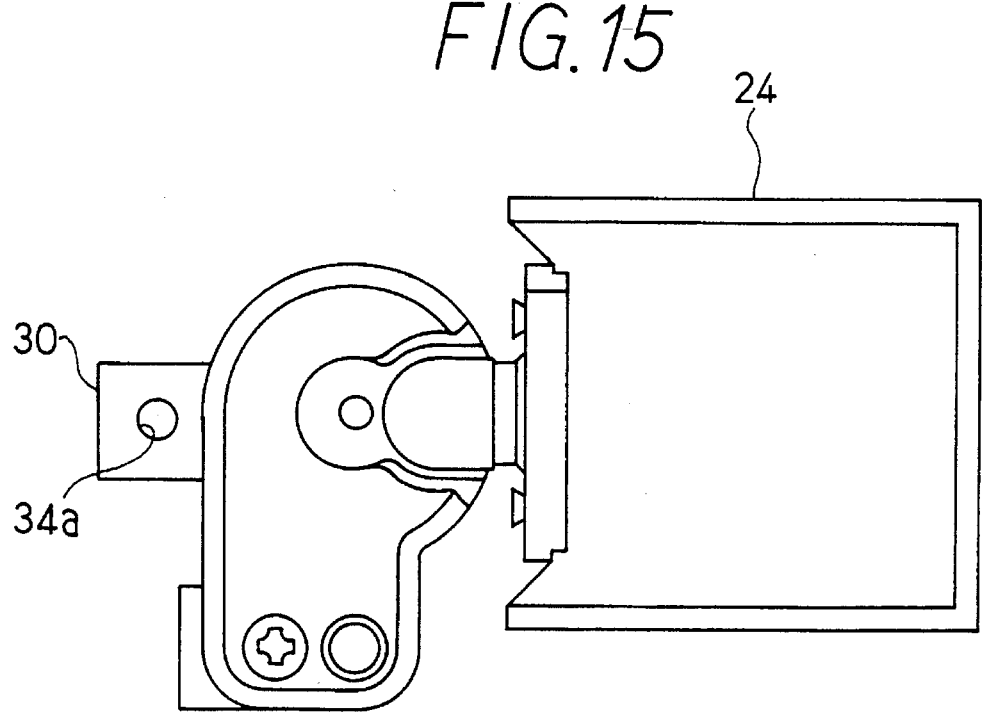
FIG. 15 is a bottom view of a modification of the first embodiment of the present invention.

It is to be noted that, in the first embodiment, fuel discharged by movement of ball 34 falls in the direction of suction from the suction port disposed in the lower part of fuel pump 10. The fuel directly hits particularly the top of fuel filter 24. As a result, the fall of the fuel may cause air bubbles within the fuel in fuel tank 1. It is preferable, therefore, that the fuel discharged from relief passage 37 is kept away from fuel filter 24 or the suction port of fuel pump 10. For instance, as illustrated in FIG. 15, it is preferable that relief passage 37 should be provided at the opposite side from fuel filter 24. Alternatively, it is acceptable that, in the composition illustrated in FIG. 1, a pipe is connected to relief passage 37 to deflect the fuel from fuel filter 24. It is further possible that a jet pump is operated by the fuel discharged from relief passage 37 to transfer the fuel from another fuel tank. In this case, it is preferable that the jet pump should be integrally composed with a connecting member.

Next, the second embodiment through the seventh embodiment will be described. In description, however, for those components which have substantially the same construction as those of the first embodiment, the same reference numbers are used to refer thereto.

Figure 5:
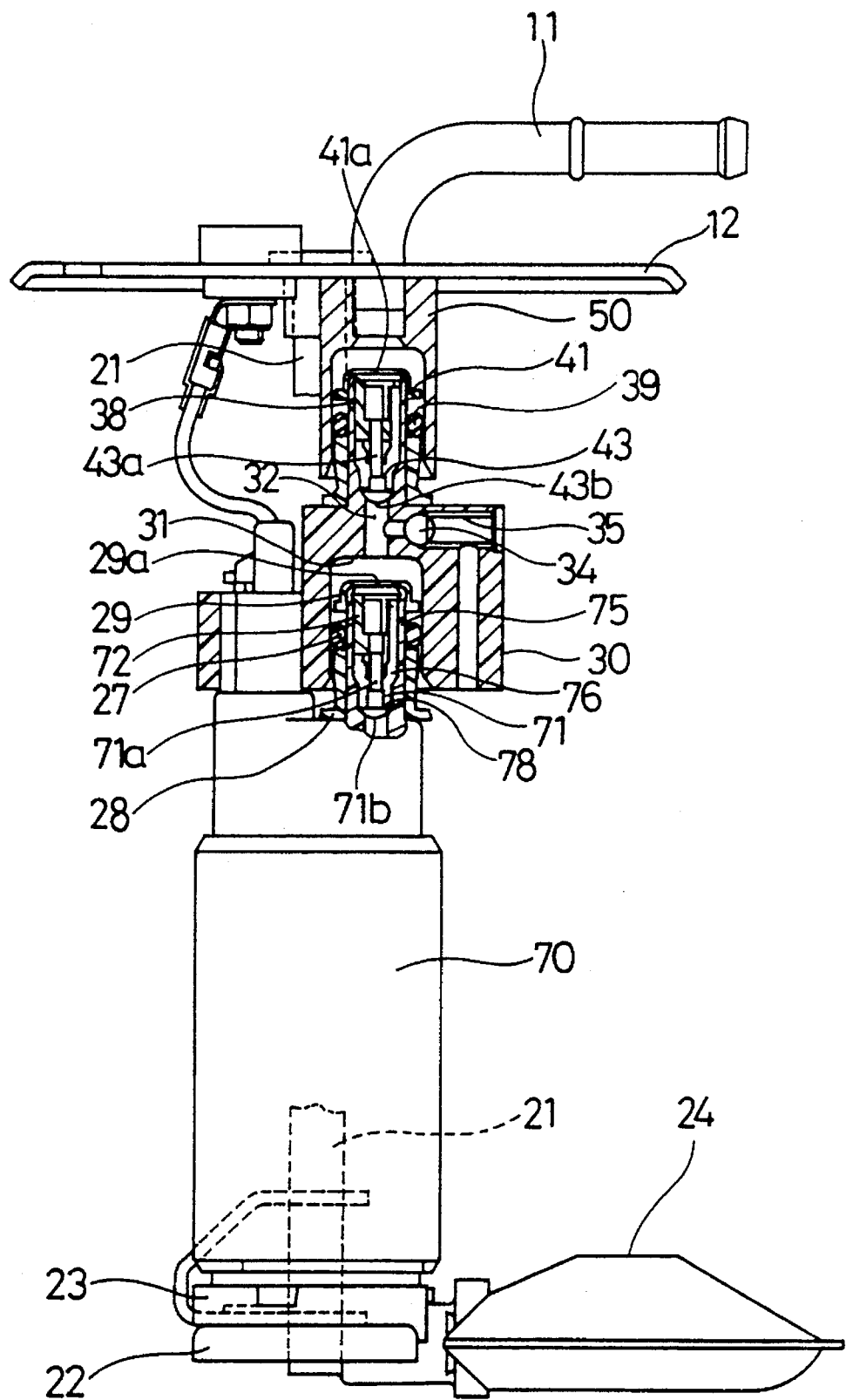
FIG. 5 is a partial cross-sectional view illustrating the fuel supply device which is the in-tank type fuel pump of the second embodiment of the present invention.

The in-tank type fuel pump of the second embodiment according to the present invention is illustrated in FIG. 5.

In the second embodiment, conventional type of pump part 70 having check valve 71 within discharge port 75 is used instead of pump part 20 of the first embodiment. In check valve 71, shaft 71a is slidably supported by stopper 72 fixed to the inner wall of discharge port 75, and head part 71b can contact valve seat 78 formed on the inner wall of discharge port 75.

Check valve 71 is continuously lifted by the fuel pressure as long as the motor of pump part 70 is in operation. The fuel flows from fuel passage 76, through recessed part 31, into fuel passage 32. When the motor of pump part 70 stops, check valve 71 contacts the valve seat 78 due to the self-weight thereof.

As in the first embodiment, ball 34 and compression coil spring 35 regulate the fuel pressure and check valve 43 maintains the residual fuel pressure.

The second embodiment has an advantage that a conventional type of pump part 70 can be used for fuel tanks without any modification.

Figure 6:
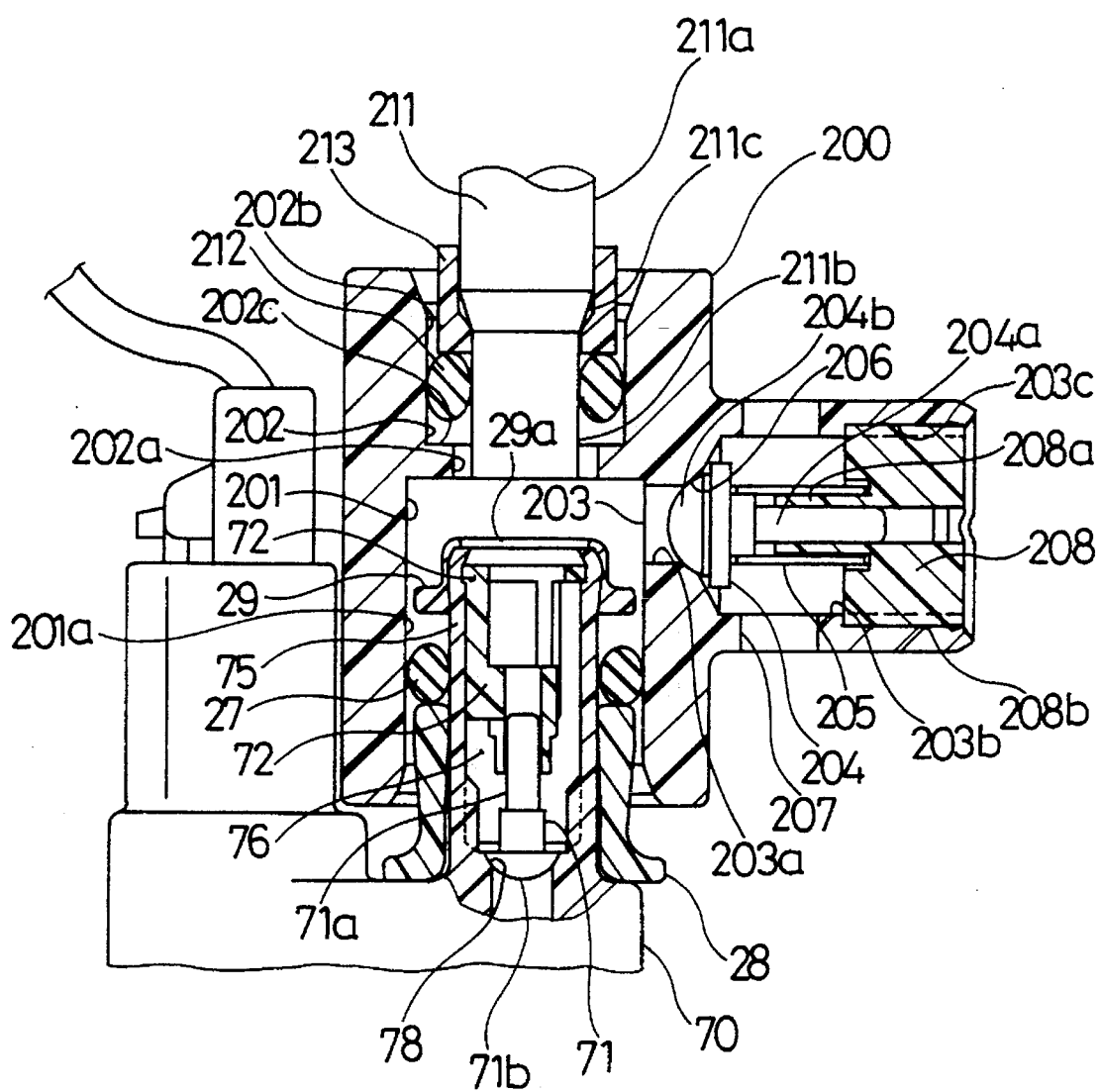
FIG. 6 is a partial cross-sectional view illustrating the fuel supply device which is the in-tank type fuel pump of the third embodiment.

The fuel pump of the third embodiment according to the present invention is illustrated in FIG. 6.

Pump part 70 is of a conventional type having check valve 71 within discharge port 75 as in the second embodiment.

Connecting member 200 includes recessed part 201 formed in the upstream side thereof. Recessed part 201 houses discharge port 75, and inner wall 201a of recessed part 201 is in contact with O-ring 27. Fuel passage 202 is formed following recessed part 201, and discharge pipe 211 is inserted to reach the boundary part between fuel passage 202 and recessed part 201. Relief passage 203 is formed in the vicinity of fuel passage 202 of recessed part 201, and relief passage 203 houses relief valve 204.

Fuel passage 202 includes small-diameter passage 202a following recessed part 201 and large-diameter passage 202b following small-diameter passage 202a.

Relief passage 203 includes small-diameter passage 203a following recessed part 201, a large-diameter passage 203b and valve seat 206 formed in the boundary part between small-diameter passage 203a and large-diameter passage 203b. Relief opening 207 is formed following relief passage 203 to allow large-diameter passage 203a to communicate with fuel tank 1.

Relief valve 204 includes head part 204b made of fluoro-rubber and shaft 204a made of brass, and pressed against valve seat 206 by the spring force of compression coil spring 205 fixed to stopper 208 on one end.

Stopper 208 slidably supports shaft 204b through bearing 208a. As external thread part 208b of the stopper 208 is engaged with internal thread part 203c of the large-diameter passage 203b, the spring force of the compression coil spring 205 pressing the relief valve 204 against the valve seat 206 can be adjusted by adjusting the fastening force of the stopper 208. As the outside diameter of bearing 208a is slightly smaller than the inside diameter of compression coil spring 205, buckling occurs due to the expansion and contraction of compression coil spring 205.

The distal end part of discharge pipe 211 in the upstream side comprises large-diameter part 211a, a small- diameter part 211b and boundary part 211c between large-diameter part 211a and small-diameter part 211b. The outer wall of small-diameter part 211b is sealed by O-ring 212. Spacer 213 is fixed to the outer wall of discharge pipe 211 covering small-diameter part 211b, boundary part 211c and large-diameter part 211a to hold O-ring 212 in place. Shoulder part 202c of fuel passage 202 prevents O-ring 212 from detaching from discharge pipe 211.

When the motor of the pump part 70 is in operation and fuel is pumped, check valve 71 is lifted by the fuel pressure, and the fuel flows from fuel passage 76, through opening part 29a of a cap 29, into the recessed part 201. In relief valve 204, shaft 204a thereof moves along the bearing 208a according to the fuel pressure. As a result, the relief valve 204 is held in the position where the balance is achieved between the fuel pressure and the spring force of the compression coil spring 205. As the shaft 204a moving along bearing 208a according to the fuel pressure, the area of the fuel passage formed by the valve seat 206 and the head part 204b varies and the flow rate of the fuel to be returned to the fuel tank is regulated. As a result, the pressure of the fuel to be supplied to the outside of the fuel tank 1 through the discharge pipe 211 can precisely be controlled.

When the motor of the pump part 70 is at a stop, as the residual fuel pressure in the recessed part 201 is smaller than the spring force of the compression coil spring 205, the head part 204b of the relief valve 204 is in contact with the valve seat 206. Being made of fluoro-rubber, the heat part 204b has so high a sealing ability that the fuel can be prevented from returning to the fuel tank 1 from the recessed part 201 through the relief passages 203 and 207. Furthermore, a head part 71b of the check valve 71 contacts a valve seat 78 to prevent the fuel from returning to the pump part 70. Due to these functions of the relief valve 204 and the check valve 71, the residual fuel pressure can suitably be maintained even when the motor of pump part 70 is at a stop.

In the third embodiment, as the fuel pressure is regulated by relief valve 204 and the residual fuel pressure is maintained by relief valve 204 and check valve 71, there is no need to provide any check valve in connecting member 200. Therefore, discharge pipe 211 can directly be coupled with connecting member 200, and there is no need to provide any supporting member. As a result, the number of parts and components can be reduced and the installation of the fuel pump can be easily performed, whereby the functions of regulating the fuel pressure and holding the residual fuel pressure can be obtained with a simpler composition.

Figure 7:
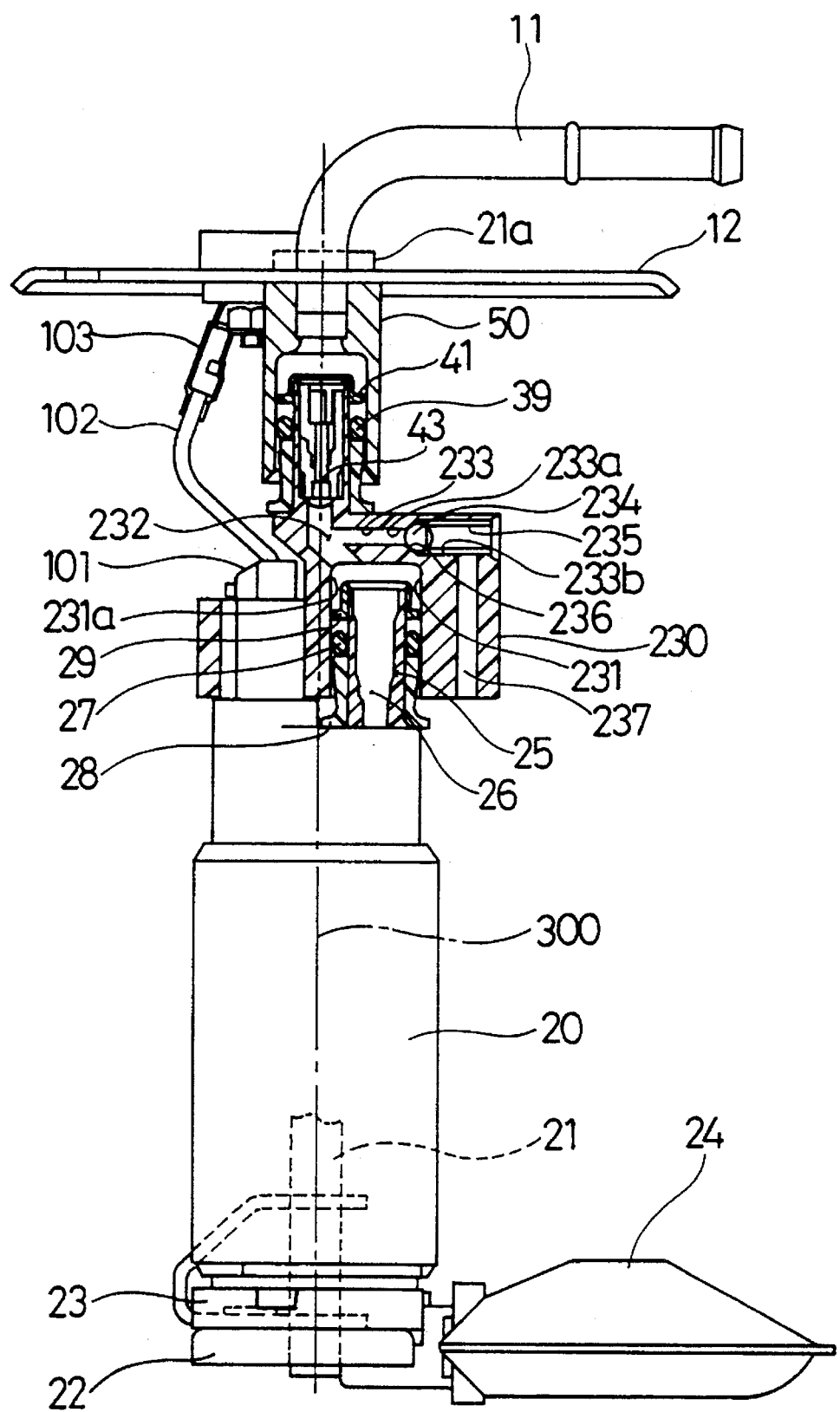
FIG. 7 is a partial cross-sectional view of the fuel supply device which is the in-tank type fuel pump of the fourth embodiment according to the present invention.
Figure 8:
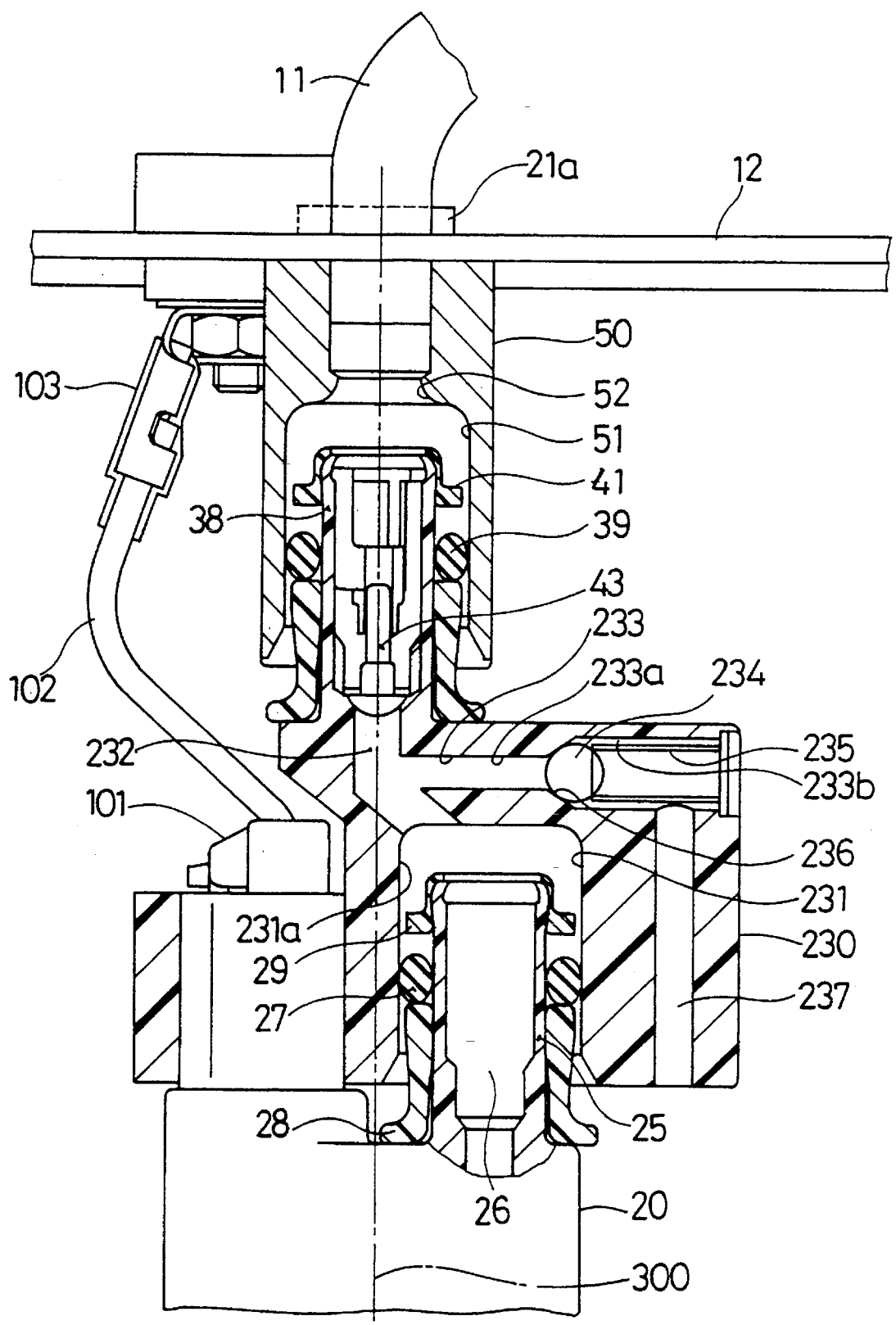
FIG. 8 is an enlarged cross-sectional view illustrating the main part of the in-tank type fuel pump of the fourth embodiment.

The fourth embodiment of the present invention is illustrated in FIGS. 7 and 8.

Connecting member 230 includes recessed part 231 formed in the upstream side, and inner wall 231a of recessed part 231 is in contact with O-ring 27. Fuel passage 232 formed following recessed part 231 diagonally extends upwards from recessed part 231 up to axial center 300 of pump part 20 and then extends vertically upward along axial center 300 of pump part 20. Discharge port 38 housing check valve 43 disposed on the extended line from fuel passage 232 is also positioned in axial center 300 of pump part 20, and recessed part 51 of supporting member 50 housing discharge port 38 and fuel passage 52 following recessed part 51 are also positioned in axial center 300 of pump part 20. Accordingly, discharge pipe 11 is in communication with fuel passage 52 in axial center 300 of pump part 20 and holds supporting member 230.

Relief passage 233 for the fuel is formed within fuel passage 232. Relief passage 233 comprises small-diameter passage 233a and large-diameter passage 233b, and valve seat 236 is formed in the boundary part between small-diameter passage 233a and large-diameter passage 233b. Ball 234 is slidably housed within large-diameter passage 233b and pressed against valve seat 236 by the spring force of compression coil spring 235. Relief passage 233 is in communication with the outside of the fuel pump through relief passage 237.

In this fourth embodiment, as in the first embodiment, the fuel pressure is controlled by ball 234 and compression coil spring 235 and the residual fuel pressure is maintained by check valve 43.

Furthermore, in the fourth embodiment, as discharge pipe 11 supports connecting member 230 in axial center 300 of pump part 20 due to the bending structure of fuel passage 232, it is less likely that the vibration in the circumferential direction of pump part 20 caused by the motor of pump part 20 is transmitted as compared with the case where pump part 20 and connecting member 230 are supported by discharge pipe 11 in a position decentered off axial center 300 of pump part 20. As not only the vibration of pump part 20 is reduced by O-rings 27 and 39 but also the vibration in the circumferential direction of pump part 20 is reduced due to the installed position of discharge pipe 11, the vibration and noise transmitted to the outside of the fuel pump can further be reduced as compared with the first embodiment through the third embodiment.

Figure 9:
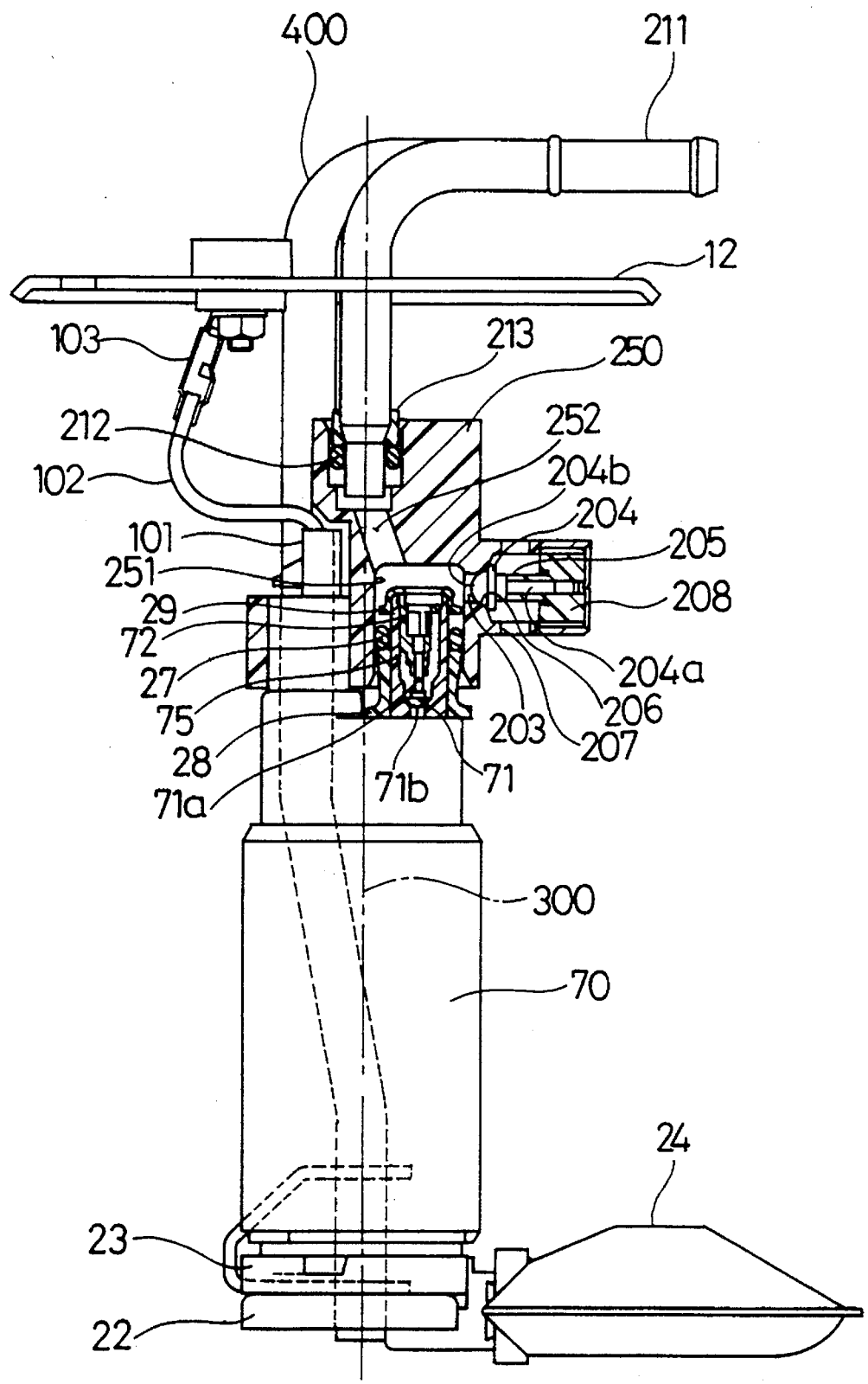
FIG. 9 is a partially cross-sectional view illustrating the fuel supply device which is the in-tank type fuel pump of the fifth embodiment according to the present invention.
Figure 10:
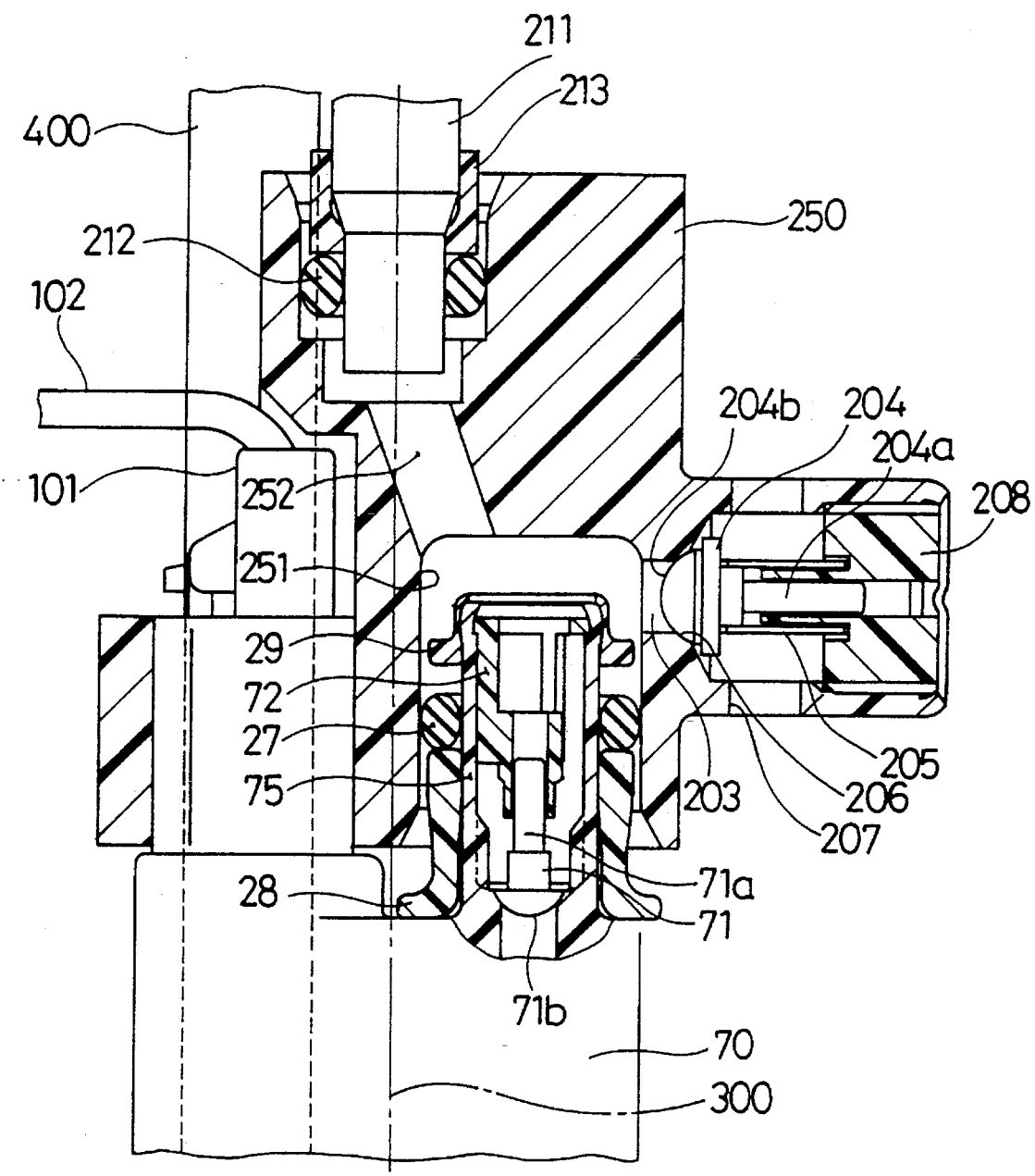
FIG. 10 is an enlarged cross-sectional view illustrating the main part of the in-tank type fuel pump of the fifth embodiment.

The fifth embodiment of the present invention is illustrated in FIGS. 9 and 10.

Pump part 70 is a conventional type having a check valve in discharge port 75. In this embodiment, return pipe 400 for returning the fuel from the engine to the fuel tank is fixed to a flange 12. A supporting base 22 is fixed to the return pipe 400 to support the pump part 70.

The fuel passage 252 diagonally extends upwards from a recessed part 251 up to the axial center 300 of the pump part 70 and then extends vertically upwards from the axial center 300 of the pump part 70 and communicates with a discharge pipe 211. The discharge pipe 211 is directly inserted into a connecting member 250 and sealed by an O-ring 212. In a relief passage 203 of the connecting member 250 is housed is a relief valve 204 to regulate the fuel pressure.

In the fifth embodiment, as the discharge pipe 211 is in communication with the fuel passage 252 in axial center 300 of pump part 70, the vibration in the circumferential direction of the pump part 70 can be reduced as in the fourth embodiment. In addition, by using a conventional type of pump 70, there is no need to provide any check valve within connecting member 250 for maintaining residual fuel pressure, and discharge pipe 211 can directly be inserted into connecting member 250. Therefore, the number of parts and components can be reduced and the installation of the fuel tank can be easily be performed.

Figure 11:
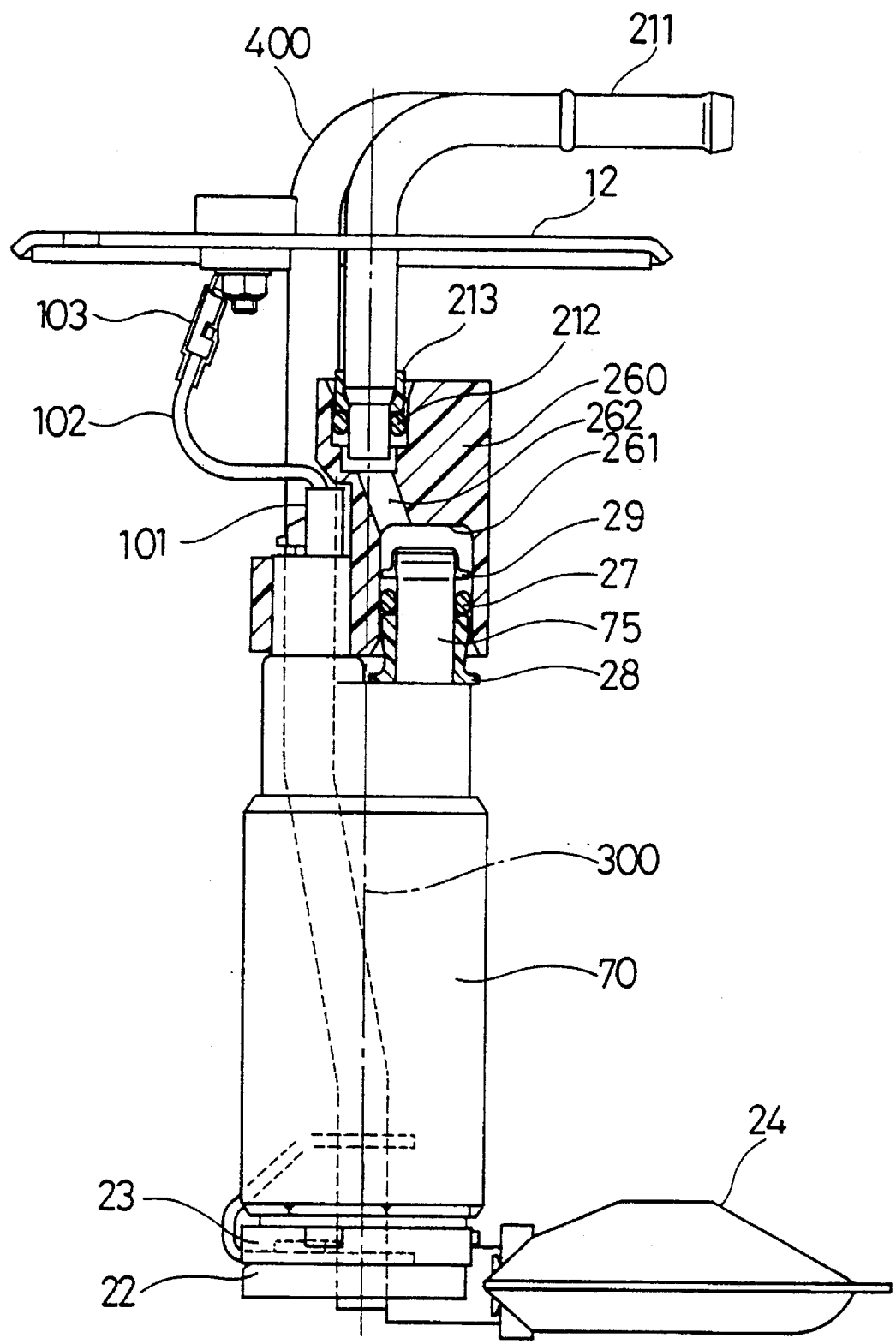
FIG. 11 is a partially cross-sectional view illustrating the fuel supply device which is the in-tank type fuel pump of the sixth embodiment according to the present invention.
Figure 12:
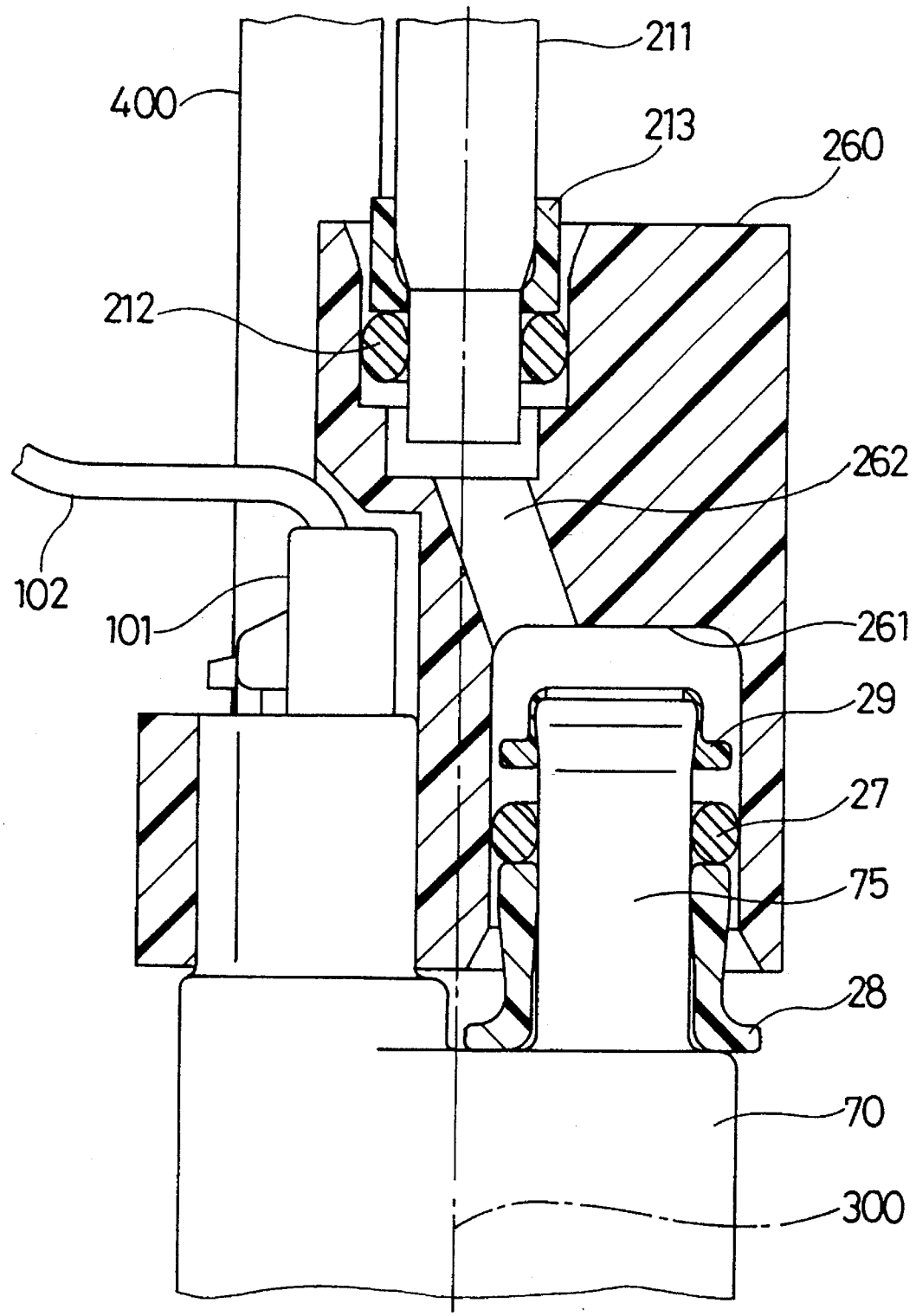
FIG. 12 is an enlarged cross-sectional view illustrating the main part of the in-tank type fuel pump of the sixth embodiment.

The sixth embodiment of the present invention is illustrated in FIGS. 11 and 12.

In this embodiment, as in the fifth embodiment, pump part 70 is of a conventional type housing a check valve within discharge port 75, and return pipe 400 for returning fuel from the engine to fuel tank 1 is fixed to flange 12. The check valve housed in discharge port 75 functions to maintain the residual fuel pressure, and return pipe 400 funtions to return any excess fuel to fuel tank 1. Accordingly, there is no need to provide any relief valve within connecting member 260 for regulating the fuel pressure or any check valve for maintaining the residual fuel pressure. Fuel passage 262 diagonally extends upwards from recessed part 261 to axial center 300 of pump part 70 and then extends vertically upwards from axial center 300 of pump part 70 to communicate with discharge pipe 211. Discharge pipe 211 is directly inserted into connecting member 260 and sealed by O-ring 212.

In the sixth embodiment, as discharge pipe 211 is in communication with fuel passage 262 in axial center 300 of pump part 70, the vibration in the circumferential direction of pump part 70 can be reduced as in the fifth embodiment. In addition, by using fuel pump 70 of the conventional type, there is no need to provide any check valve within connecting member 260 for maintaining the residual fuel pressure. Moreover, return valve 400 functions to return the surplus fuel supplied to the engine back to the fuel tank. Thus, there is no need to provide any relief valve within connecting member 260 for regulating the fuel pressure. Furthermore, as this arrangement allows discharge pipe 211 to be directly inserted into connecting member 260, the number of parts and components can substantially be reduced, and the installation of the fuel tank can easily be performed.

Figure 13:
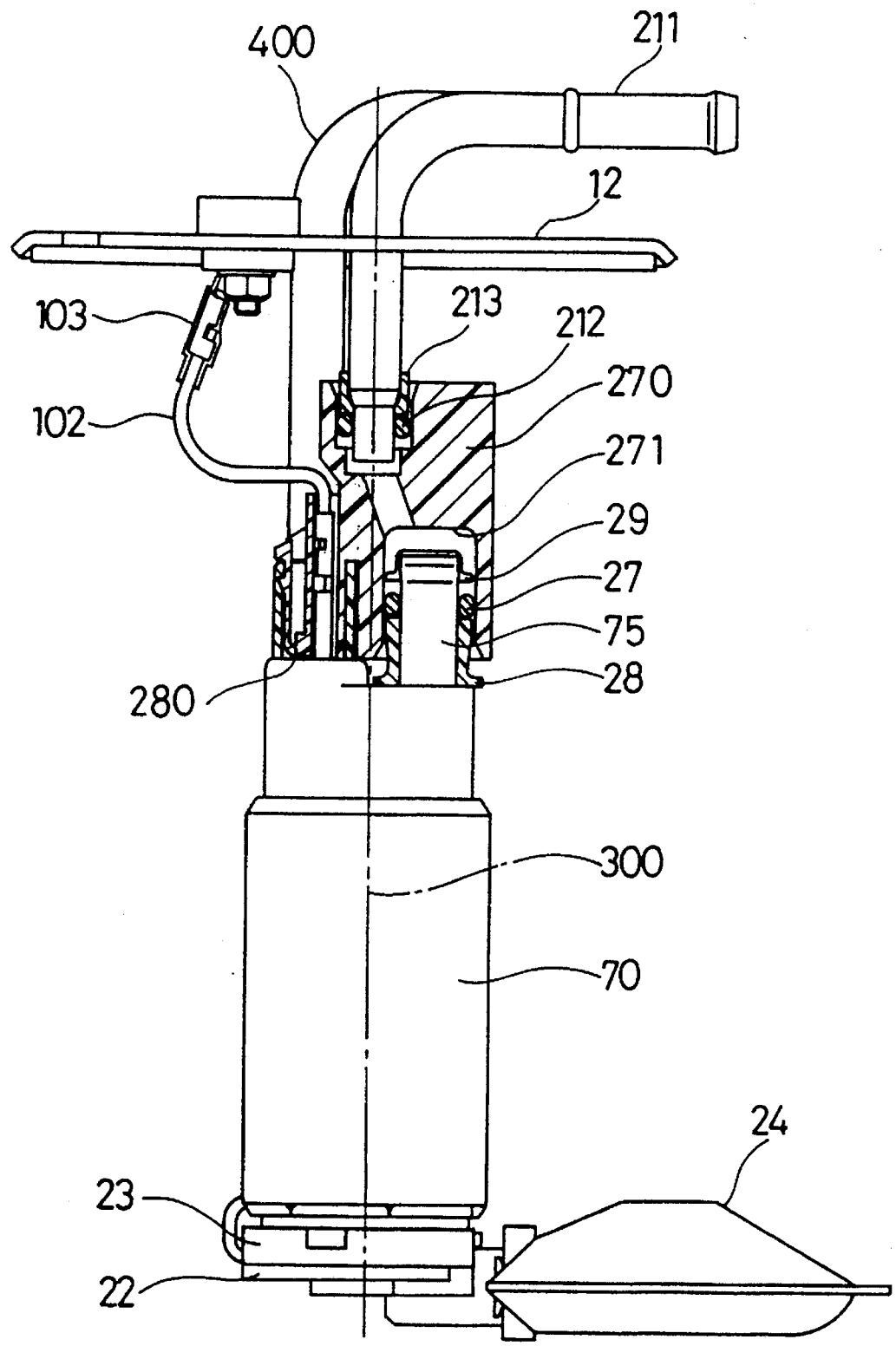
FIG. 13 is a partially cross-sectional view illustrating the fuel supply device which is the in-tank type fuel pump of the seventh embodiment according to the present invention.
Figure 14:
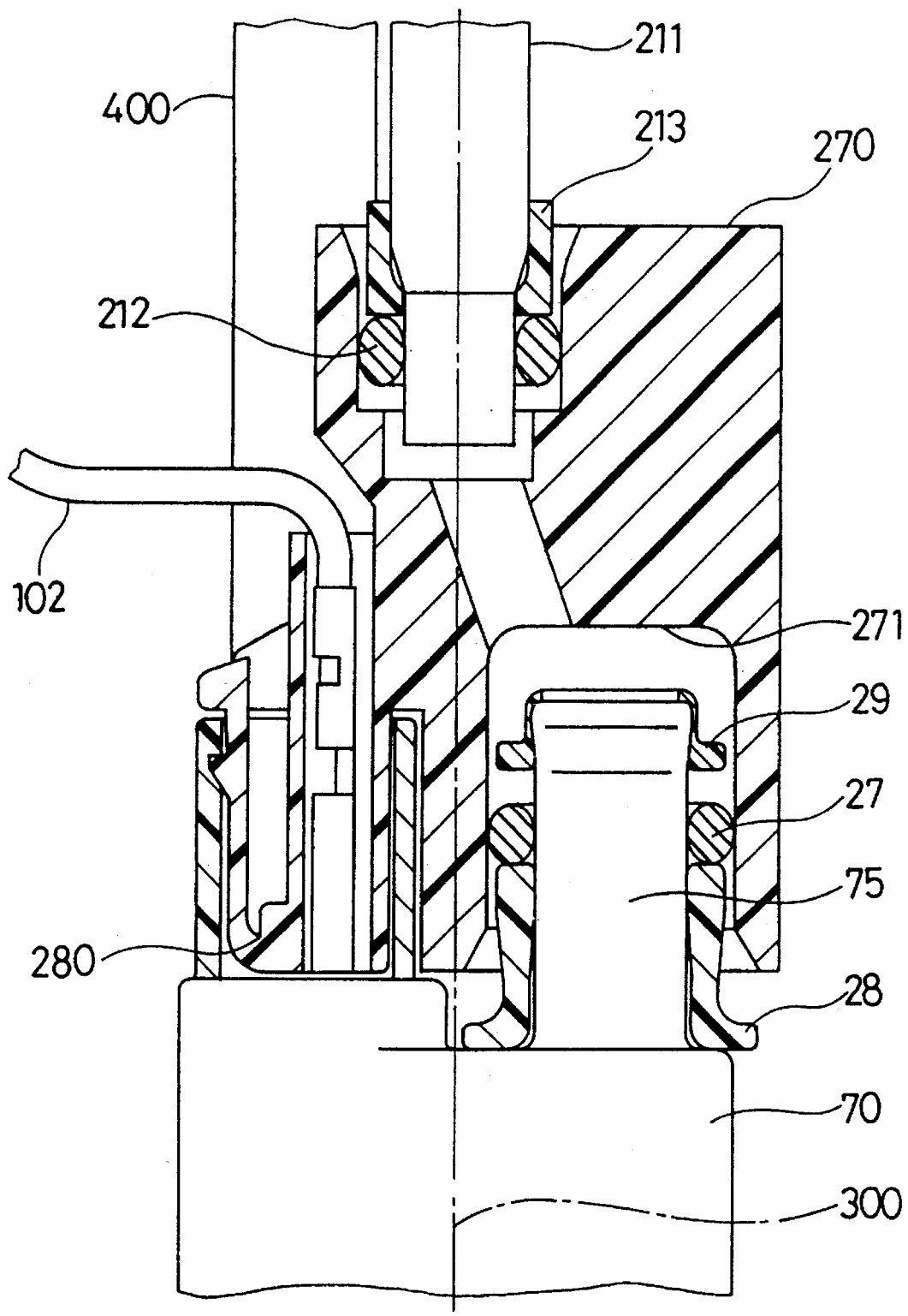
FIG. 14 is an enlarged cross-sectional view illustrating the main part of the in-tank type fuel pump of the seventh embodiment.

The seventh embodiment of the present invention is illustrated in FIGS. 13 and 14.

In the seventh embodiment, electric power connector 280 for the motor housed in pump 70 in the sixth embodiment is integrally formed with a connecting member 270. As a result, the number of parts and components can further be reduced, and the installation of the fuel tank can easily be performed. All the other advantages are the same as those obtained by the sixth embodiment.

In the in-tank type fuel pump according to the present invention as described above, the connecting member having the fuel passage therein for communicating the fuel pump with the discharge pump is supported by the fuel pump and the discharge pipe through the seal ring, the vibration of the fuel pump can be reduced and the installation of the fuel pump can easily be performed.

The present invention has been described in connection with what are presently considered to be the preferred embodiments of the present invention. However, this invention is not meant to be limited by the disclosed embodiments, but rather is meant to cover various modifications and equivalent arrangements included within the spirit and scope of the appended claims.

What is claimed is:

1. A fuel supply device comprising:

a fuel tank for storing fuel therein;

a fuel pump disposed within said fuel tank and having an electrical connector portion thereon;

a discharge pipe disposed on a wall of said fuel tank for supplying fuel from said fuel pump to an outside of said fuel tank;

a first connecting part formed with a first fuel passage therein and disposed adjacent to said electrical connector portion on said fuel pump;

a second connecting part formed with a second fuel passage therein and receiving one end of said discharge pipe therein;

a connecting member formed in a rigid block shape having a third fuel passage therein and attached to said first connecting part and said second connecting part for communicating said first fuel passage to said second fuel passage through said third fuel passage, said connecting member having a body portion for attachment to said first connecting part and a frame portion for fitting over an exterior of said electrical connector portion;

a first sealing member disposed in said third fuel passage to seal a space between said first connecting part and said connecting member; and a second sealing member disposed in said third fuel passage to seal a space between said second connecting part and said connecting member.

2. A fuel supply device comprising:

a fuel tank for storing fuel therein;

a fuel pump disposed within said fuel tank and having an electrical connector housing and a fuel discharge port thereon;

a discharge pipe connected to said fuel tank for supplying fuel from said fuel pump to an outside of said fuel tank; and a connecting member disposed in said fuel tank and formed with a fuel passage therethrough for communicating said discharge port and said discharge pipe, said connecting member having a body portion for attachment to said discharge port and a frame portion for attachment to said electrical connector housing.

3. The fuel supply device according to claim 2, wherein:

said discharge pipe is connected at an end thereof to a fuel consumption device outside said fuel tank so that said fuel consumption device functions as a dead end of said discharge pipe;

said connecting member is formed with a return passage which is in communication with said fuel passage and opening into said fuel tank;

a pressure control valve is movably disposed in said return passage to return excess fuel in said fuel passage into said fuel tank for regulating pressure of fuel in said fuel passage at a constant value relative to a pressure in said fuel tank; and a check valve movably disposed in said fuel passage downstream from said return passage to prevent reverse flow of fuel from said discharge pipe to said discharge port when a pressure in said discharge port decreases below a pressure in said discharge pipe.

4. The fuel supply device according to claim 1, wherein said connecting member includes a fourth fuel passage opening to said third fuel passage and a fuel pressure control valve which opens and closes said fourth fuel passage according to the pressure of the fuel within said third fuel passage for maintaining the pressure of the fuel within said discharge pipe to be equal or less than a preset pressure.

5. The fuel supply device according to claim 4, wherein the other end of said discharge pipe is connected to a fuel consumption device only, so that all the fuel from said discharge pipe is supplied to said fuel consumption device without return to said fuel tank.

6. The fuel supply device according to claim 5, wherein said connecting member allows said third fuel passage downstream from said fuel pressure control valve to pass the fuel from said fuel pump to said discharge pipe and is provided with a check valve in said third fuel passage downstream from said fuel pressure control valve for preventing the fuel from flowing from said discharge pipe to said fuel pump upon decrease of fuel pressure in said first fuel passage.

7. The fuel supply device according to claim 1, wherein said connecting member allows said third fuel passage communicating from said fuel pump to said discharge pipe to pass the fuel from said fuel pump to said discharge pipe and is provided with a check valve disposed in said third fuel passage for preventing the fuel from flowing from said discharge pipe to said fuel pump upon stop of operation of said fuel pump.

8. The fuel supply device according to claim 1, wherein said fuel pump is provided with a discharge port as said first connecting part in a decentered position off an axial center thereof;

wherein said connecting member positions the second connecting part on the side of said discharge pipe in said axial center; and wherein said third fuel passage of said connecting member includes an inclined passage extending from the first connecting part at the side of said fuel pump towards said axial center.

9. The fuel supply device according to claim 8, wherein said fuel pump is supported on both sides thereof on the extended line of said axial center through said connecting member.

10. The fuel supply device according to claim 1 wherein said connecting member is integrally provided with an electric power receiving connector to be connected to said connector portion of said fuel pump.

11. The fuel supply device according to claim 4, wherein said fuel pump is equipped with a fuel filter; and wherein a means is provided for keeping fuel discharged from said fourth fuel passage away from said fuel filter.

* * * * *